Figure 5:
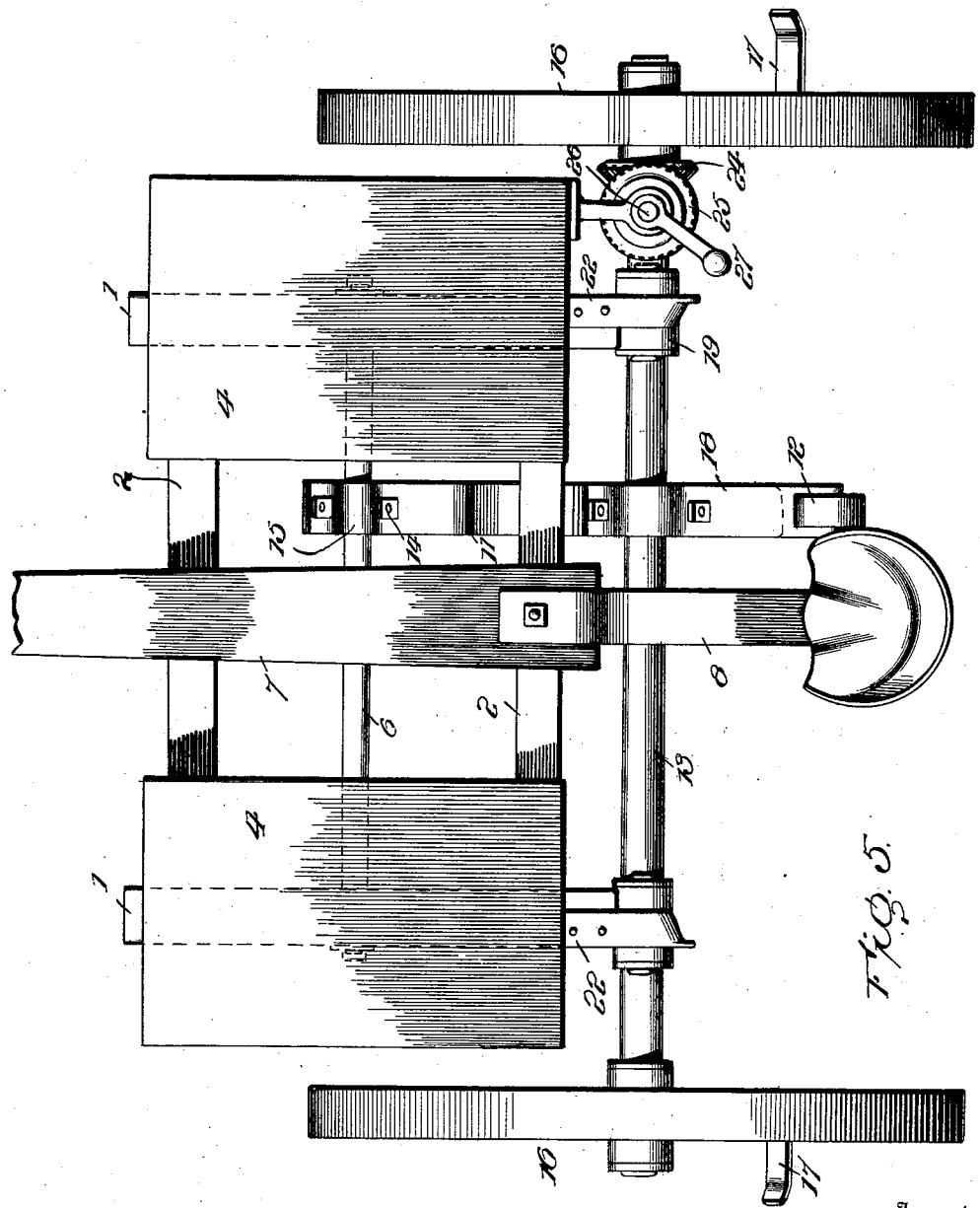

No. 742,596. PATENTED OCT. 27, 1903.
W. CONARD.
CHECK ROW PLANTER.
APPLICATION FILED MAR. 21, 1903.
NO MODEL. 3 SHEETS—SHEET 1.
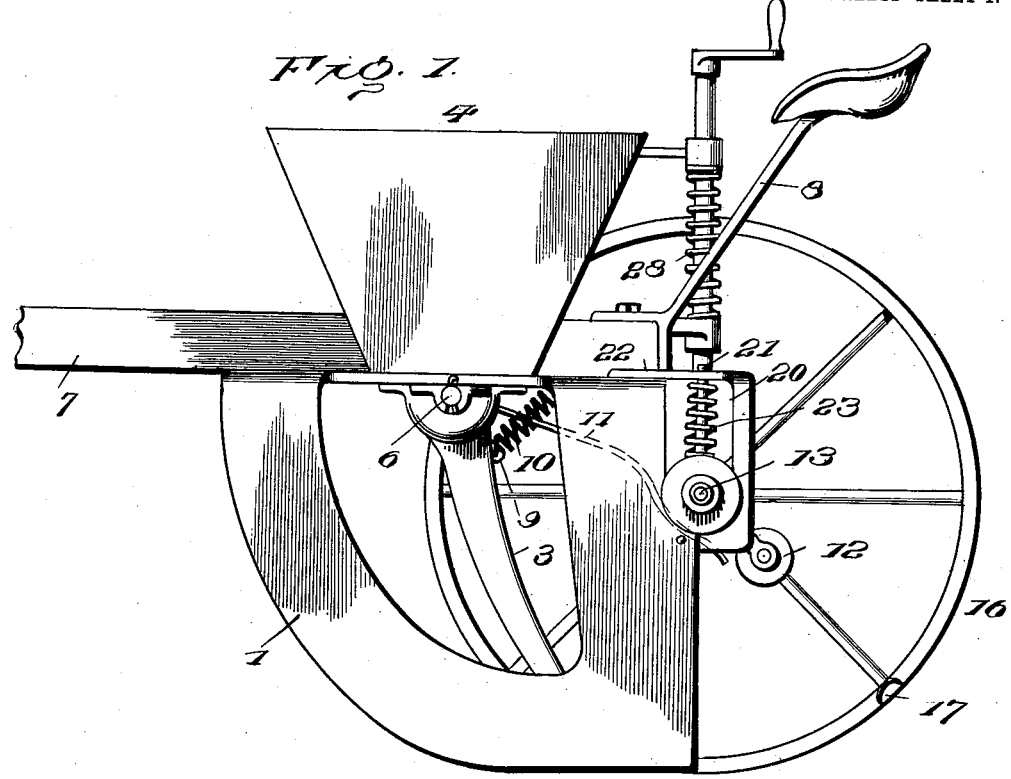
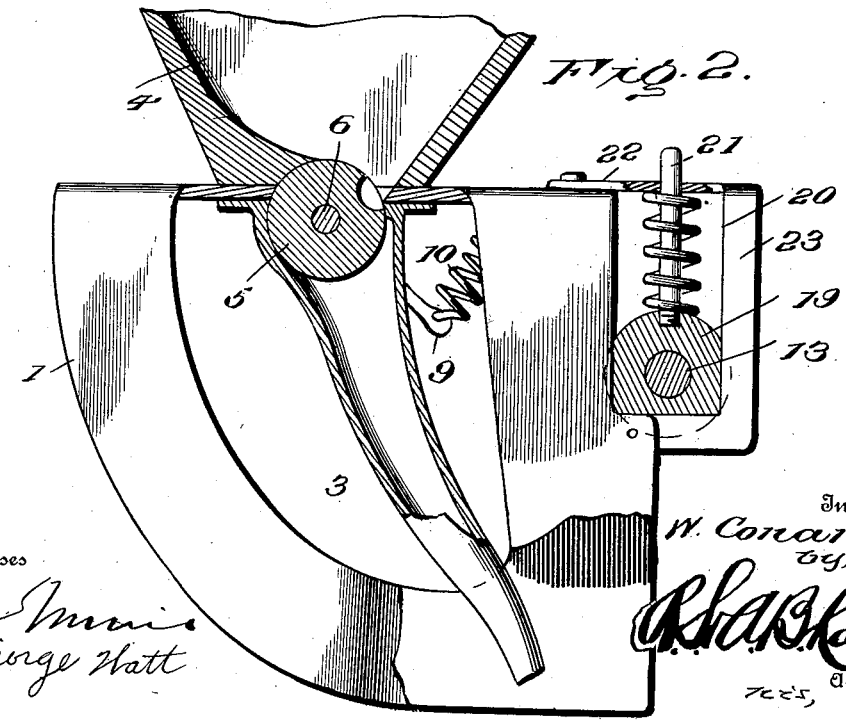
Witnesses
Inventor
W. Conard
by
Attorneys

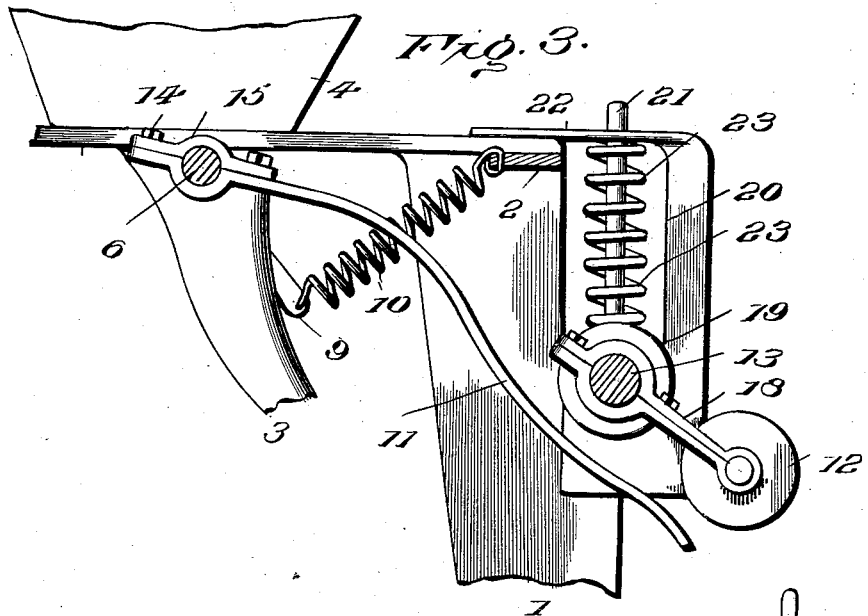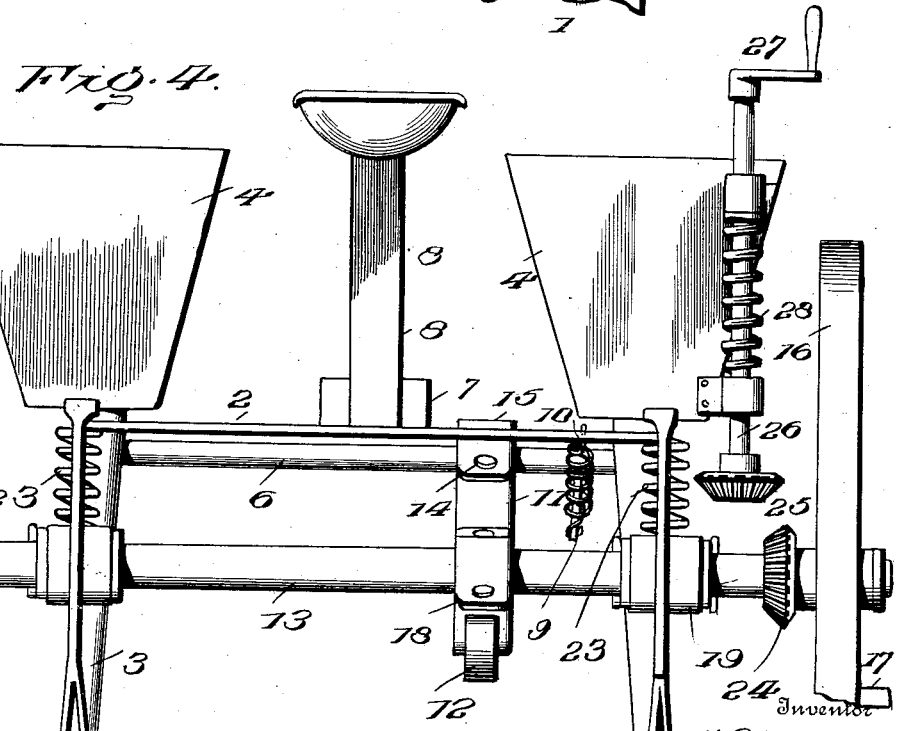

No. 742,596. PATENTED OCT. 27, 1903.
W. CONARD.
CHECK ROW PLANTER.
APPLICATION FILED MAR. 21, 1903.
NO MODEL. 3 SHEETS—SHEET 3.

Witnesses
George Watt
Emily H. England

Inventor
W. Conard
By
R. S. Lacey, Attorney

No. 742,596. Patented October 27, 1903.

UNITED STATES PATENT OFFICE.

WALDO CONARD, OF WILLCOCKSON, ARKANSAS.

CHECK-ROW PLANTER.

SPECIFICATION forming part of Letters Patent No. 742,596, dated October 27, 1903.

Application filed March 21, 1903. Serial No. 148,974. (No model.)

*To all whom it may concern:*

Be it known that I, WALDO CONARD, a citizen of the United States, residing at Willcockson, in the county of Newton and State of Arkansas, have invented certain new and useful Improvements in Check-Row Planters, of which the following is a specification.

This invention has relation to the class of machinery designed for sowing seed, such as corn, in check-rows, the purpose being to devise a novel mechanism for actuating the seed-dropping mechanism and at the same time allowing for variation of surface over which the implement is traveling and providing means under the control of the driver to admit of alining the machine at any time, so as to insure planting of the seed in straight rows transversely across the field.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side elevation of a planter embodying the invention. Fig. 2 is a view similar to Fig. 1, on a larger scale, parts being omitted and parts being in section. Fig. 3 is a detail view showing more clearly the means for operating the seeding mechanism and yieldably supporting the operating shaft or axle. Fig. 4 is a rear view. Fig. 5 is a plan view of the planter.

Corresponding and like parts are referred to in the following description and indicated in all the views of the drawings by the same reference characters.

The planter may be of any structural type and, as illustrated, is mounted upon runners or furrow-openers 1, which carry the seeding mechanism and the operating means therefor. The runners 1 are rigidly connected by transverse bars 2, and their lower rear ends are spread to receive the discharge ends of grain-tubes 3. Hoppers 4 are mounted upon the runner-frame, and the seed-dropping wheels 5, coöperating therewith, are mounted upon shaft 6, journaled in bearings applied to the runner-frame and adapted to be oscillated at proper intervals, so as to effect a delivery of the grain in time to effect planting of same in check-rows. The pole or tongue 7 is secured to the runner-frame in any accustomed way, and the seat-standard 8 is attached to the rear end thereof in any substantial manner. Shaft 6 is provided with arm 9, to which one end of spring 10 is connected, the opposite end of said spring being secured to a suitable part of the machine-frame to normally hold the seed-dropping wheels 5 in position for receiving grain from the hoppers. A tappet-arm 11 is secured to shaft 6 and curves rearwardly and downwardly and is adapted to be struck at intervals by tappet 12, applied to operating shaft or axle 13. The tappet-arm is adjustable on shaft 6 and is secured in the desired position by bolts or like fastenings 14, passed through openings near the ends of clamp 15 and corresponding openings in the upper end of arm 11, the parts of 11 and 15 embracing shaft 6 being oppositely deflected, so as to encircle same. The tappet-arm is slightly resilient, so as to yield and accommodate itself to the varying positions of tappet 12 incident to vertical movement of shaft or axle 13 due to unevenness of surface over which the implement passes.

Operating shaft or axle 13 is provided at its ends with ground-wheels 16, secured thereto for rotation therewith, said ground-wheels being provided with markers 17 to indicate the hills or places where the grain has been planted. The tappet 12 is secured to said shaft or axle and consists of a wheel and arm 18, the latter being adjustably connected to part 13 in substantially the same manner as tappet-arm 11 is secured to shaft 6, thereby admitting of adjustment of the tappet. The shaft or axle 13 is adapted to move vertically to admit of ground-wheels 16 following the contour of the ground over which the machine may be drawn. The bearings 19 are mounted in guides 20 and are provided with stems 21, passed through cross-piece 22, spiral springs 23 being mounted on stems 21 and confined between parts 19 and 22 and normally exerting a downward pressure on shaft or axle 13 to hold wheels 16 in contact with the ground. The guides 20 may be provided in any manner and are formed at the upper rear edges of runners 1 and by same and brackets 23, secured to said runners at their upper and lower ends. The bearings 19 are notched in opposite edges to embrace edge portions of the guides, so as to prevent longitudinal movement of shaft or axle 13.

It frequently happens that the seed-dropping mechanism gets out of line, particularly when turning the machine prior to recrossing the field, and in order to aline the machine—that is, to effect a planting of the seed in straight lines transversely of the field—the following instrumentalities have been devised: A miter-gear 24 is secured to axle or shaft 13, and a companion miter-gear 25 is applied to the lower end of vertical shaft 26, same being provided at its upper end with crank-handle 27. Shaft 26 is slidably mounted in bearings applied to a convenient portion of the framework and is normally held elevated by coil-spring 28, so as to keep miter-gears 24 and 25 separated. When the seed is planting out of line, which may be determined by markers 17, shaft 26 is depressed to bring miter-gear 25 in contact with miter-gear 24, and shaft 13 may be either retarded by holding shaft 26 stationary or said shaft may be rotated either forward or backward, as desired, by operating crank-handle 27. Any one of these operations serve to aline the machine and cause the grain to be dropped in check-rows.

Having thus described the invention, what is claimed as new is—

1. In a check-row planter, and in combination with the seeding mechanism comprising a shaft, a tappet-arm, means for adjustably connecting said tappet-arm to the shaft, an operating-shaft mounted to move vertically, and a tappet having adjustable connection with said operating-shaft and adapted to coöperate with the aforementioned tappet-arm, substantially as described.

2. In a check-row planter, and in combination with the seeding mechanism comprising a shaft, a resilient tappet-arm secured to said shaft and longitudinally curved, a vertically-movable operating-shaft, and a tappet secured to said operating-shaft and adapted to engage with the curved portion of the tappet-arm, substantially as specified.

3. In a planter, and in combination with the planting mechanism, and a marker, the latter comprising a shaft, means for alining the planting mechanism, same comprising a vertically-movable shaft, coöperating gears applied to said vertically-movable shaft and the marker-shaft, the latter being retarded or advanced by said movable shaft when the coöperating gears are in mesh, substantially as set forth.

In testimony whereof I affix my signature in presence of two witnesses.

WALDO CONARD. [L. S.]

Witnesses:
H. A. STOCKTON,
L. O. JOHNSON.